United States Patent Office 3,042,578
Patented July 3, 1962

3,042,578
INSULATING PRODUCT AND ITS MANUFACTURE
Paul S. Denning, Kissimmee, Fla., assignor to Johns-Manville Perlite Corporation, a corporation of Illinois
No Drawing. Filed Sept. 19, 1955, Ser. No. 535,305
25 Claims. (Cl. 162—171)

This invention relates to thermal and acoustical insulating materials and their manufacture The product is essentially expanded perlite held together by a network of fiber preferably treated with a tack increasing substance to increase the effective length of the fiber by increasing the mutual friction or tack of the fibers. The product may be made most economically from an aqueous slurry (which is unexpectedly free filtering) by various apparatus including those used in making paper and fiber board, but this economical method of making departs fundamentally from conventional methods heretofore used for making thick fiber board.

The nature of the invention and further details thereof may be readily understood by reference to illustrative products and their methods of manufacture hereinafter described.

This application is a continuation in part of my co-pending applications Serial No. 41,533, filed July 30, 1948; Serial No. 370,415 and Serial No. 422,696, now all abandoned. The said co-pending applications mainly claim various features of the product and methods of manufacture.

I have discovered that expanded perlite even when as fine as that used in the illustrative products of this and the above parent applications is very free filtering, that is, it de-waters quickly. This is important in the illustrative method of making the product wherein the solids are dispersed in an aqueous slurry of pourable consistency (though of vastly greater concentration than conventional fiber slurries used in the manufacture of fiber board and the like) and then formed and de-watered. Such a slurry may be very rapidly de-watered as compared with the time required to de-water the fiber slurry (with or without other aggregates or fillers) heretofore used for the forming of fiber board. This is a property peculiar to perlite as compared with other insulating aggregates such, for example as exfoliated vermiculite which is very slow filtering (regardless of particle size) due to the multitude of contacting flat faces and lamina characteristic of exfoliated vermiculite. As stated above, the product is essentially a mass of expanded perlite particles contacting each other only in limited areas sufficient to prevent shrinkage yet leaving the mass "open" to receive the fiber network or skeleton without impairing rapid de-watering. The amount of fiber used is generally small compared to the large volume of perlite (one illustrative volumetric ratio being about 5 or 7 of perlite to 1 of fiber).

Preferably, the proportion of fiber is limited to what is necessary to give adequate strength to the product, because additional fiber would unnecessarily reduce the de-watering or filtering rate. Since the fibers lie mainly in the interstices between the granules of perlite, the fiber does not substantially increase the volume of the product over what it would be with no fiber added. In one type of expanded perlite granules of which about 70% are minus 16 and plus 50 mesh, about 48% of the total volume comprises voids between the granules. This means that fiber equivalent to about 48% of the total volume of the perlite might be added without increasing the volume of the final product over that determined by the perlite alone. Actually, of course such a high amount of fiber is not only unnecessary but actually objectional.

The significance of avoiding increase in volume over that determined by the perlite alone is this: If so much fiber were added as to cause increase in volume over that of the perlite without fiber, there would be substantial shrinkage of the product on drying. Shrinkage is obviously objectionable. A mass of perlite alone does not substantially shrink on drying because the granules of perlite are in substantial contact with the surrounding granules and since they act as though they were generally spherical in character, they provide interstices in which the fibers may lie without increasing the volume of the mass over that of the perlite alone; and drying out of the water held by the fibers does not, therefore, result in shrinkage of the product. The term "generally spherical" is employed to describe the nature of the contacts between granules rather than their literal shape. Like spheres, they contact in points rather than in surfaces wherein capillarity would operate to hold water and thereby resist de-watering; and like spheres they provide spaces where fibers may lie without increasing the volume of the mass of granules alone. Actually, the granules may have (but not always) numerous points projecting from them (called "rabbit ears" in the trade) which have the same effect as spherical surfaces, of limiting contacts to points rather than surfaces.

The fibers, on the other hand, are maintained by the perlite particles in the form of an open net work and held against segregation which would retard de-watering. The perlite particles provide such a fine grained texture as to leave no large voids where a substantial large number of fibers may collect and block the voids and interfere with rapid de-watering. The open texture of the fiber net work maintained by the perlite and substantial absence of bunching or segregation of the fibers, is further revealed by inability of the fibers to retain or hold a substantial amount of water during the de-watering process, as compared with products in which a substantial number of fibers are close together. The product may, therefore, be de-watered to what is termed a "dry" condition, leaving much less water to be removed by drying with heat.

Except for the foregoing considerations and those next enumerated, the fiber may be varied from the above illustrated ratios. If increased, it provides some increase in strength but with sacrifice of insulating efficiency, non-combustibility and rapid de-watering properties and with increase in cost. For example, if the product has as high as 30% by weight of vegetable fiber (such as newsprint) it begins to lose some of its rapid de-watering speed. With 20% by weight of newsprint, the product has adequate strength, i.e., a modulus of rupture of 45 pounds per square inch.

Ratios by weight between the fiber and perlite vary with the nature and density of the fiber. The controlling relationship is actually the ratio between numbers of individual fibers and the numbers of particles of fine perlite, but there is no practical way of counting either numbers of fiber or perlite particles. Hence, in describing the invention the ratio can be best expressed either by volume, or preferably by weight for each specific fiber or other variable constituents. The preferred ratio (fiber to perlite) by weight of newsprint and similar wood or vegetable fiber is about 20–30 parts by weight of fiber to 70–80 parts by weight of perlite, but for the same number of commercial asbestos fibers (for example) as paper fiber, the weight of the asbestos fiber would be much greater because asbestos has a high specific gravity and it is not practically possible to sub-divide asbestos into its ultimate fibers, a "fiber" actually comprising a bundle of fibers. Commercial asbestos fiber has a specific gravity of about 2.5 whereas paper or wood fiber has a specific gravity of .6 to .7. Therefore a given number (or volume) of asbestos fibers is very substantially heavier (about 4 times) than the same number or volume of vegetable fibers. As illustrating the difference in relationship between the various constituents when expressed by dry weight of the finished product and when expressed by volume; in one illustrative product comprising by weight,

| | Percent |
|---|---|
| Perlite | 60 |
| Asbestos fiber | 30 |
| Kraft fiber | 10 | the ratio of the several constituents by volume is approximately

| | Percent |
|---|---|
| Perlite | 90.93 |
| Asbestos fiber | 5.84 |
| Kraft fiber | 3.23 |

If the total volume of the product (including the voids between the perlite granules, about 48%) were considered, the volumetric ratio of fiber to perlite would be still lower.

The above volumetric relationships demonstrate that the product is essentially perlite and not fiber adulterated with perlite. Further, the circumstance that the product will not support combustion (even though all the fiber be vegetable) demonstrates how well the fibers are separated or isolated from each other, and how small the proportion of fiber actually is.

The illustrative product may be made from perlite ore which is preferably too fine for use for plaster and concrete aggregates. Such ore is generally from minus 50 to plus 100 mesh, which results in a high percentage of expanded perlite which should preferably not be used in plaster or concrete aggregates. However, the product is not limited to particular ore sizes or to a specific range of sizes of the expanded perlite granules, except preferably not more than 2 to 5 percent should be finer than 325 mesh (i.e. 44 microns) and preferably not more than 20% should be larger than 8 mesh. However, large granule sizes, assuming that there be an adequate range of smaller sizes, are objectionable only to the extent that they may tend to float to the top in an aqueous slurry and thereby segregate. The present process, herein fter described, is adaptable for use with crude perlites, but in expanded form in a wide variety of classifications or grades of crudes. The particular grade of crude perlite ore, as mined, often determines the particular grade of expanded perlite available for the manufacture of the instant board. The following grades of perlitic ore and expanded perlite are adaptable, for example, for use in the manufacture of insulating products according to the present process:

(1) Crude ore which has an approximate screen analysis of 20% plus 100 mesh and 80% minus 100 mesh which produces an expanded perlite having an approximate screen analysis of 70% minus 16 mesh plus 50 mesh (weighing approximately 2½ to 3½ pounds per cubic foot), (2) Crude ore having an approximate screen analysis of 92% plus 40 mesh and 8% minus 40 mesh, which produces an expanded perlite having an approximate screen analysis of 93% plus 100 mesh and 7% minus 100 mesh weighing approximately 3 pounds per cubic foot), (3) Crude ore having an approximate screen analysis of 75–80% plus 100 mesh and 20–25% minus 100 mesh, which produces an expanded perlite having an approximate screen analysis of 91% plus 100 mesh and 9% minus 100 mesh (weighing approximately 3 pounds per cubic foot), (4) Expanded perlite, the major portion of which passes a 20 mesh screen and finer with a substantial portion 100 mesh, and (5) Expanded perlite, the major portion 65 mesh and finer with a substantial portion 100 mesh.

It is possible to effect a mixture or selection of various grades, utilizing particularly those grades not suitable for the manufacture of other products, as for example, plaster and concrete aggregates. The following expanded perlite gradings are also suitable for use in the instant process for manufacturing the board of this invention:

(1) Expanded perlite, substantially 100% passing through 30 mesh and preferably 90% passing through 50 mesh. Preferably, substantially none of it should be coarser than 20 mesh.

(2) Expanded perlite of which the particles are 65 mesh and finer.

(3) Expanded perlite, 59% of which is plus 65 mesh and 41% minus 65 mesh, with substantially none coarser than 20 mesh.

Generally speaking, the expanded perlite used for the manufacture of the insulating board of this invention should be of a grade such that a major portion, or at least a substantial portion be capable of passing through a 20 mesh screen and a substantial portion be of approximately 100 mesh grade or finer.

The term "perlite" is used herein in a generic sense to include perlite and perlitic vesiculating materials generally.

To distribute the relatively small amount of fiber uniformly throughout the large bulk of expanded perlite particles, short fiber such as newsprint or other relatively short vegetable or mineral fiber (e.g. glass wool, fiber glass, asbestos) is preferably used. Newsprint fiber (which has the advantage of relatively low cost) has an average length of about 1/16" with a maximum length of ¼", whereas kraft fiber (which may also be used, though it is more expensive) has an average fiber length of about ¼ to ¾". Asbestos fiber of 5D Canadian grading is short enough so that about 75 will pass through a 4 mesh screen and will be retained on a 10 mesh screen. While a small amount of long fiber (vegetable or mineral) can also be distributed throughout the perlite, it is difficult to substitute long fiber (despite the advantage of its greater strength) entirely for the short fiber. Long fiber bunches if it be present in any substantial amount, and thereby makes difficult uniform distribution of it throughout the slurry.

To obtain strengths comparable to what would be obtained if long fiber could be used substantially exclusively, the short fiber is preferably treated to increase its mutual friction or tack by applying thereto a relatively small amount of a non-migrating friction increasing substance dispersible in water. In the illustrative method such substance is preferably added to the aqueous slurry containing the fiber, in the form of an emulsion or dispersion to permit distribution of the relatively small amount over the relatively large surface of the fiber. It tends to collect on the fibers rather than on the perlite particles. For convenience such substances will be referred to herein as a tack material or substance adhesive, or binder. It should preferably be non-migrating so that it will remain on the fibers and not travel to the surface with the water as it is removed from the product or concentrate in the surface of the product on drying. This excludes most true solutions even though they have tacky characteristics. For most products migration of the tack substance to and concentration in the surface layer of the product, is not desired, though where a very strong and tough surface layer is desired, some migration may be permitted. In most such cases, the interior of the product would be correspondingly weaker.

It is believed that the adhesive increases the friction between the fibers and their resistance to being pulled apart. Thus treated, the fiber gives strengths comparable to those which would be obtained with long fiber if the latter could be practicably distributed uniformly throughout the product. Uniform fiber distribution is vastly more important in a product of this character (which is essentially perlite with only enough fiber to form the aforesaid network or skeleton) than in a product which is essentially fiber and contains various solids or aggregates as fillers. While it is believed that the adhesive substance acts as a tackifier to adhere the fibers to each other, it is evident that some form of binding action occurs among the perlite, the fibers, and the adhesive, since the solid ingredients are held in a compact homogeneous mass. The believed tackifying action between the ingredients is theoretical, and difficult to prove or disprove. Crude tests have shown that asphalt is attracted more to the fibers than to the perlite. On the other hand, the final board also has the appearance of a board containing fiber and perlite held together by a binder. As a result, while it is believed that a tacking action between the fibers and the adhesive occurs and very little tacking takes place between the perlite and adhesive, for the purposes of this invention the adhesive may also be considered as a binder.

In general and independently of the specific fiber and tack substance used, the ingredients of which the board is comprised should be present in amounts by weight in accordance with the following approximate percentage ranges: expanded perlite particles, 40%–80%, fibers, 50%–10%; and adhesive or binder, up to approximately 30%, but for most commercially attractive products not more than approximately 25% and not less than approximately 5% for most products best exemplifying the invention. Preferably, an approximate general formula by dry weight for a finished insulating and acoustical product is:

|  | Percent |
| --- | --- |
| Perlite | 60–70 |
| Fiber | 15–30 |
| Tack substance | 10–25 |

To avoid too low a strength, the ratio by weight of fiber to perlite should preferably not be substantially less than 1 to 4½. A ratio by weight of fiber to perlite of about 1 to 3 is preferred. In terms of weight of the product made with vegetable fiber, this is about 20% fiber and 60 to 70% perlite, the balance being tack substance. For other fibers the weight may vary slightly depending on the characteristics, length, weight and strength of the fiber. Insulating board of this character should not weigh substantially more than 8 to 10 pounds per cubic foot; but if a tougher and stronger board be necessary weights may be increased to 15 pounds per cubic foot by greater compression of the board during manufacture.

The concentration of solids in the slurry used in the illustrative method depends somewhat on the method of manufacture. When the product is formed on a cylinder machine or Fourdrinier, the concentration of solids may be 3 to 8% to make a product having a dry thickness of at least one inch. High rather than low concentration of solids is preferred both to increase production and to combat any tendency of the larger particles of expanded perlite to rise in the slurry. This contrasts with the dilute slurries used in the manufacture of conventional fiber board and paper in which the solids cannot exceed .02 to .5%. When formed in a suction mold the concentration of solids in the slurry may be much higher than for a cylinder or Fourdrinier machine. Regardless of the method of formation, de-watering is very rapid due to the "open" nature of the mass of perlite particles and absence of fiber bunching or segregation.

After and during forming, the board is lightly compressed to give it uniform thickness and to consolidate it. The residual moisture (remaining after application of suction and pressing) is preferably driven out by heat to accelerate drying.

Whether the board is dried in a continuous web or cut in pieces before drying, depends on the type of apparatus. Generally it is preferable to cut the web transversely at intervals before entry into the drier. The dried board is then trimmed to size; and if it be intended for use as an acoustical material, the face of the material may be drilled to provide conventional sound receiving recesses, or a thin layer may be cut from the surface if it be desired to increase the porosity of the surface for sound absorption. For other uses, surface cutting would be undesirable.

Various binder, tack or friction increasing substances may be used, depending somewhat on the uses and desired properties of the product. In my said co-pending applications, bituminous emulsions, sodium silicate, pitch, bentonite, and various resins and dispersions of starch and cements are disclosed. Light colored tack substances, such as sodium silicate, starch and light colored cements and resin emulsions or suspensions are preferred for an acoustical or sound insulation since they would not bleed through or discolor the material if painted. Emulsified asphalt has the advantage of low cost and it gives the product excellent water repellency, and, surprisingly, the product will not support combustion. At very high temperatures both the asphalt and fiber (if it be a vegetable fiber) will char to a limited depth, but the product will not support combustion, nor will it disintegrate. As stated in my co-pending application Serial No. 41,533, it seems to deposit on the surface of the fibers to the exclusion of the perlite. This is due to the circumstance that the product is mainly perlite and the vegetable fiber and asphalt are so separated and isolated by the perlite, that they cannot transmit combustion from one point to another. The same applies to other organic tack substances such as starch and resins disclosed in said co-pending applications.

The invention is not limited to the specific tack substances enumerated, but considerations of availability, cost, etc., practically limit them to tack substances which are low in cost and (when the illustrative method of manufacture is used) are readily dispersible in an aqueous slurry. Other solvents or liquid phases for the tack substances are costly and may be more difficult to disperse in water, and they may also involve a fire hazard in manufacture. Aside from the matter of relatively high cost, synthetic resins could be employed. One example is calcium acrylate, a water soluble monomer which becomes water insoluble. In general, however, water solutions tend to migrate to the surface on drying and tend to concentrate the tack substance in the surface. This is characteristic of most soluble tack substances, and it has been regarded as true of sodium silicate.

Sodium silicate in an aqueous solution has long been used as a binder for various products but its use as an adhesive has heretofore been limited to those products in which migration of the sodium silicate to, and substantial concentration in the surface layer of the product, has not been objectionable. For example, sodium silicate has been used to bond exfoliated vermiculite in a molded or otherwise formed product, but on drying, the water therein on escaping to the surface carries a substantial amount of the silicate to the surface where it is left as the water evaporates. The surface layer of such a product is quite strong and dense but if it be trimmed off for any reason the remainder of the product, having little silicate to bond it, is very weak. Also, in other products, sodium silicate has been vulnerable to the presence of moisture and is not regarded as water resistant. For these reasons, although its adhesive properties are excellent, sodium silicate has not been regarded as satisfactory for products in which substantial migration to the surface is objectionable or where it may be exposed to moisture.

I have discovered that contrary to all previous experience in the use of sodium silicate, the sodium silicate does not substantially or objectionably migrate to the surface in the present product, which comprises mainly expanded perlite. I believe this is due to reaction of the sodium silicate with the perlite itself which is an aluminum silicate. My present theory is that the reaction between the perlite and the sodium silicate increases the viscosity of the latter or otherwise changes its nature so that it migrates less readily. Sodium silicate does react with glass, and perlite is a glass. Among the evidences that some reaction does take place between the sodium silicate and perlite, is the circumstance that if pure sodium silicate solution be passed through a body of expanded perlite, an aluminum silicate is found in the filtrate. Aluminum silicate is a very refractory bonding agent. Furthermore, increase in the soda to silica ratio (which might occur in such reaction) increases the viscosity of the sodium silicate, thereby reducing its tendency to migrate on drying out of the water. Also, the fact that in some cases perlite acts as a catalyst may explain the unexpected impairment of its tendency to migrate. Other aggregates do not thus affect sodium silicate. For example, if exfoliated vermiculite be substituted (in identical volume) for the perlite in the illustrative product, with no other change, the sodium silicate will migrate so substantially that the modulus of rupture of the center 1″ core of a 3″ thick slab is reduced by 40% over the strength of the remaining outer 1″ thick pieces of identical dimension. In a similar perlite slab, there is only a small difference in the modulus of rupture between the center core of the slab and the remaining pieces, indicating some, though small, migration.

Another indication of a change in the nature of the sodium silicate in association with expanded perlite, is the unexpected resistance to disintegration of the illustrative product under prolonged soaking in water. Soaking in water for over a month, while softening the product somewhat, did not result in disintegration. After drying, the product retained 75% of its original strength. In otherwise identical products wherein exfoliated vermiculite replaced the expanded perlite, complete disintegration occurred after soaking for 72 hours. As a bonding agent, sodium silicate has been notoriously vulnerable to moisture. Its unexpected resistance thereto in association with perlite demonstrates a change in character or some new relationship; and is some confirmation that an insoluble aluminum silicate bond is formed by reaction between the perlite and sodium silicate.

The sodium silicate also serves an added function if the product be subjected to high temperatures. On exposure to high temperatures (which would char the fiber, if it be vegetable fiber) sodium silicate fluxes some of the glass of the perlite to form a more or less continuous glass film to reinforce the product and prevent disintegration. A product of this character will withstand the severe fire tests specified in Federal Specifications SS-A-118-a, which comprises exposure of a 9 square foot area of the product for 40 minutes to an impinging flame which raises the temperature from room temperature to 1700 degrees F. in 25 minutes and then holds the temperature between 1700 degrees F. and 1706 degrees F. for the remainder (15 minutes) of the test without substantial falling apart of the product. The continuous glass reinforcement formed by the sodium silicate, even though the fiber be charred, prevents disintegration of the product under such heat.

As stated above, the fiber (if it be vegetable fiber) is too isolated and is present in too small an amount to assist in propagation of flame or combustion throughout the product. The very large proportion of perlite acts as a barrier to propagation of combustion along the fibers. The depth of penetration of the charring temperatures above defined, does not exceed about ½ inch.

Of course, non-combustible fibers such as glass fiber, asbestos, etc., may be used, particularly if the product be intended for use at temperatures which would char vegetable fiber, but otherwise vegetable fiber such as newsprint or kraft is preferable from the standpoint of cost and ease of distribution throughout the slurry.

The aforesaid tack substances while contributing different incidental properties to the product, are believed to have the common characteristic of increasing the tack or mutual friction between the fibers, increasing their resistance to pulling apart and giving the product a strength equivalent to that theoretically obtainable with long fiber, if the latter could be uniformly distributed throughout the product, and of effecting a binding action to combine and retain the ingredients into a compact, homogeneous mass.

According to the illustrative method of manufacture, the several constituents are preferably incorporated in an aqueous slurry which may be used either in a cylinder forming machine like an Oliver, in a Fourdrinier machine, or in a simple mold. The former two machines while not designed to make a product of such character or thickness or at such speed, from a slurry of such concentration, are nevertheless satisfactory, particularly considering the great cost of designing a similar apparatus specifically for manufacture of a product of this character.

As stated in my co-pending application Serial No. 41,533, dilution with water beyond what is necessary to make a pourable slurry, is preferably avoided. Even with such an abnormally high concentration of solids the illustrative products may be readily made to dry thicknesses of 1″ and more without difficulty. Indeed, the limitation on thickness is not determined by the time required for dewatering (because even thicker material may be quickly dewatered) but by that thickness which may be most rapidly dried in the drier after de-watering, material thicker than 1″ requiring more than a proportionally longer time to dry. It is preferable, therefore, to form the boards not substantially thicker than 1″ to obtain the most efficient drying and if a thicker board be desired a plurality of boards may be cemented together to obtain the desired thickness.

Generally, the board comes from the de-watering step so fully de-watered that it is termed "dry" (though it is not literally dry) and needs little or no pressing before it enters the drier. Generally, a single pair of pressing rolls suffices. However, it should be remembered that the suction used in de-watering causes compression of the board to some extent through the action of atmospheric pressure.

Of course, an even greater concentration of solids may be formed and de-watered in simple suction molds, but such methods of formation are slow as compared with formation by a cylinder or Fourdrinier machine.

With the low fiber content which characterizes the present product, strength varies with the proportion of fiber. Where insulating efficiency is paramount, preferably no more fiber is used than is necessary to hold the perlite in its formed shape. If the fiber content be increased, the tack substance should also proportionately increased, to obtain the benefit of increase in strength obtainable from the increased proportion of fiber. Within limits, depending on the proportion, length and strength of the fiber, strength can also be increased by increasing the amount of tack substance. Excess tack substance (beyond what is necessary to obtain maximum strength with a given proportion of fiber) however, increases weight and reduces insulating efficiency without any compensating advantage.

The following are illustrative examples of products embodying various tack substances:

Example No. 1

| | Percent by weight |
|---|---|
| Expanded perlite (weighing three pounds per cubic foot) | 70 |
| Fiber (pulped newsprint) | 20 |
| Asphalt (used in the form of an emulsion containing 40–60% asphalt) | 10 |

Example No. 2

| | Percent |
|---|---|
| Expanded perlite | 68.2 |
| Newsprint fiber | 22.7 |
| Asphalt | 9.1 |

| Example | #3 | #4 | #5 | #6 | #7 |
|---|---|---|---|---|---|
| Expanded perlite..........percent.. | 54.9 | 51.7 | 48.6 | 45.4 | 42.3 |
| Paper pulp fiber..................do.... | 32.6 | 30.8 | 28.9 | 27.0 | 25.2 |
| Glue fiber............................do.... | 2.5 | 2.5 | 2.5 | 2.5 | 2.5 |
| Asphalt................................do.... | 10.0 | 15.0 | 20.0 | 25.0 | 30.0 |
| Modulus of Rupture (Lbs./sq. in.).. | 50.2 | 52.2 | 59.4 | 83.7 | 56.1 |

A product designed to withstand moderate temperatures (i.e., 800 degrees F.–1200 degrees F.) comprises the following:

Example No. 8

| | Percent |
|---|---|
| Expanded perlite | 48 |
| Asbestos fiber | 24 |
| Kraft fiber | 8 |
| Sodium silicate | 20 |

The sodium silicate employed was 6 to 10 Bé. concentration with a soda to silica ratio of 1 to 3.36. Although the kraft fiber chars at the temperatures to which a board of this character is exposed, it provides a good wet strength during manufacture.

Other examples are described in detail in said co-pending application Serial No. 41,533.

If the tan color resulting from the use of asphalt as a tack material be objectionable for any reason, as in an acoustical insulation, light colored tack substances such as sodium silicate and those disclosed in said co-pending application Serial No. 370,415 may be used. One material using starch as a tack substance comprises:

Example No. 9

| | Percent by weight |
|---|---|
| Expanded perlite | 68 |
| Fiber | 22 |
| Cooked starch | 10 |

The above product weighs 6½ to 7½ pounds per cubic foot and has a modulus of rupture of 50 to 60 pounds per square inch. Roughly, the ratio of starch to fiber is about 0.4 of a pound of starch per pound of fiber; while as little as 5% of cooked starch may be used, better strengths are obtained with 10%.

Other examples using starch are as follows:

| Example | #10 | #11 | #12 | #13 |
|---|---|---|---|---|
| Expanded perlite percent | 67.5 | 65.0 | 62.5 | 60.0 |
| Paper pulp fiber do | 22.5 | 25.0 | 27.5 | 30.0 |
| Starch do | 10.0 | 10.0 | 10.0 | 10.0 |
| Modulus of Rupture (Lbs./sq. in.) | 51.9 | 62.5 | 70.9 | 78.8 |

The starch gives unexpected water resistance: Prolonged soaking of the product in water for three weeks results in only slightly softening of the material. Greater water resistance may be obtained by the addition of a water repellent material such as a resin emulsion. Additional water repellent substance used for an acoustical board should, of course, be limited to a material which will not objectionably discolor the board. One suitable water repellent substance is an aqueous emulsion of a vinyl acetate polymer.

In addition to its advantages in a product subject to high temperatures sodium silicate, because of its light color may also be advantageously used as a tack substance in acoustical installation.

To insure adequate reaction between the sodium silicate and the perlite, the concentration of the former should not be below 4 degrees Beaume. Indeed, if the concentration is below 6° Bé. The material will not pass the fire test specified above. The preferred concentration is 10 degrees Bé. Concentrations in excess of 15 degrees Bé. would increase cost and weight and serve no useful purpose.

The following are illustrative products embodying sodium silicate as a tack substance:

Example No. 14

| | Percent by weight |
|---|---|
| Expanded perlite (weighing 3 to 3¼ pounds per cubic foot) | 56.72 |
| Fiber (pulped newsprint) | 19.91 |
| Sodium silicate, dry (introduced as a 10 degree Bé. solution) | 23.37 |

The above product has a modulus of rupture of 106.8 pounds per square inch, a weight of 9.81 pounds per cubic foot and is capable of passing the above fire test. The above strength substantially exceeds what is necessary for an acoustical insulation.

Another product employing a lower concentration of sodium silicate comprises:

Example No. 15

| | Percent by weight |
|---|---|
| Expanded perlite (weighing 3–3¼ pounds per cubic foot) | 59.27 |
| Fiber (pulped newsprint) | 20.81 |
| Sodium silicate, dry (introduced as 8 degrees Bé. solution) | 19.90 |

The above product has a modulus of rupture of 79.93 pounds per square inch, weighs 9.11 pounds per cubic foot and will pass the above fire test.

A third product employing a sodium silicate solution of minimum concentration (4 degrees Bé. solution) comprises:

Example No. 16

| | Percent by weight |
|---|---|
| Expanded perlite (weighing 3–3¼ pounds per cubic foot) | 65.85 |
| Fiber (pulped newsprint) | 23.11 |
| Sodium silicate, dry (introduced as a 4 degree Bé. solution) | 11.04 |

Such a product has a modulus of rupture of 61.11 pounds per square inch, a weight of 7.86 pounds per cubic foot but failed, after 18 minutes' exposure to the fire test. While the latter strength would be sufficient for an acoustical insulation, if the board were not superficially trimmed, such a low concentration of sodium silicate results in some migration to the surface with the result that if superficially trimmed, to expose the maximum open pores the strength would be less.

Another product embodying asbestos fiber with sodium silicate as a tack substance comprises:

Example No. 17

| | Percent by weight |
|---|---|
| Perlite | 48 |
| Asbestos (5D) fiber | 24 |
| Kraft fiber | 8 |
| Sodium silicate | 20 |

The expression 5D above is a Canadian standard classification for an appropriate type of commercial asbestos which generally identifies the character of fiber by fiber length etc.

Such a product may be made by the above described method from slurry containing 5% solids in which the solids comprise:

| | Percent by weight |
|---|---|
| Perlite | 60 |
| Asbestos fiber | 30 |
| Kraft fiber | 10 |

Proportions of the several constituents may be varied considerably in relation to each other, but for products having generally the physical properties of those given above, the constituents should preferably not vary substantially more than the following: Perlite 5% above or below that given above; kraft fiber not substantially more than 2% above and below; and sodium silicate not more than 4% above and below. The asbestos fiber may vary between 15 and 35%. However, to obtain the advantages which should ensue with an increase, for example, in fiber, the tack substance should also be increased and vice versa. For, in order to obtain the increase in strength which additional fiber should provide, there must be an increase in tack substance. On the other hand if the fiber be reduced, the tack substance can be correspondingly reduced without causing additional loss in strength.

Considering the various practical uses of the product and the strengths desired for such uses, a 10 degree Bé.

sodium silicate solution will provide the maximum strength necessary for the major types of uses and a great surplus of strength for many uses. Such a concentration, using the same ratio of fiber to perlite as above, results in 23% of solid sodium silicate in the product. Besides providing adequate strength, if the product be exposed to fire, enough sodium silicate is in the product to form the supplementary reenforcing glass developed on exposure to fire. Aside from the matter of increase in cost resulting from increasing amount of sodium silicate, too much sodium silicate is not desirable in products designed for maximum resistance to fire because too large an amount of fluxed glass in the product may cause high internal stress, resulting in warping or cracking of the product on cooling.

While there are various grades of sodium silicate (varying in their soda to silica ratio) the least expensive commercial grade (having a soda to silica ratio of 1 to 3.36) is satisfactory.

Except for high temperature thermal insulation (i.e. temperatures of 300 degrees F. and higher) and products in which vegetable fiber is objectionable for other reasons, vegetable fiber is preferably used both because of low cost and because it facilitates manufacture by low cost methods. For temperatures of 600 degrees F. to 1200 degrees F. encountered in industrial insulation such as pipe coverings, it may be desirable to replace part or all of the vegetable fiber with mineral fiber such as asbestos and glass fiber. Preferably some vegetable fiber is used to give increased wet strength. In products of this character sodium silicate is preferable as a tack material. Between 300 degrees F. and 600 degrees F., vegetable fiber can be used if there be no objection to slight local or superficial charring in the regions where the higher temperatures are encountered.

While the product might be made by other methods than the above described slurry method, these are regarded as less economical. Substantial and unexpected advantages accrue from manufacture on a Fourdrinier machine: (1) the stock or furnish may be more concentrated, as high as 8% solids, an unbelievably high concentration, the limitation on concentration being not the difficulty of de-watering, but the flowability of the furnish, with higher solids-concentration, the furnish might not flow with sufficient readiness; (2) because of the high solids concentration, larger perlite particles can be included than could be used in a less concentrated furnish because of their tendency to float to the surface; and (3) an opportunity is afforded for removal of a substantial amount of water by natural drainage while the board is on the wire and before it reaches the suction boxes.

To make a 1" thick finished product, the furnish is flowed onto the wire (which is a foraminous surface) at about 2½" in thickness. Even before reaching the suction boxes (a distance of about 20 feet, traveling as fast as 9 feet per minute) it has de-watered itself by natural drainage (i.e. without suction) to a point where it is practically self-sustaining (i.e. deckle boards are no longer required to maintain the margins of the wet board). In passing over the suction boxes and under the pressure and gauge rolls (but before passing into the driers), the material comes down to about 1" in thickness (e.g. about 1.04"). In the drier it shrinks about 4/100" in thickness. Absence of substantial shrinkage is due, as stated above, to the circumstances that the product is substantially entirely perlite particles in contact and that the fibers lie in the spaces between the contacting perlite particles.

If due to the high concentration of solids, the surface texture of the stock as it lies on the Fourdrinier wire, is rough, this roughness may be completely removed and a perfectly smooth top surface produced by gentle puddling of the surface of the stock on the wire before it reaches the suction boxes.

In mixing up the furnish it is advantageous to add the expanded perlite to a slurry containing the fiber (an aqueous slurry of about 1.5 to 2.5% fiber concentration) with an agitating action so that the perlite particles are fully wetted. For example, the perlite may be added to a whirlpool or vortex of the fiber stock which feeds into the head box containing the conventional agitator and feeder. The tack substance (e.g. emulsified asphalt, sodium silicate, etc.) may also be added to the vortex to be thoroughly distributed throughout the furnish.

As stated above, the unique characteristics of the expanded perlite make possible the high concentration of solids in the furnish, the high proportion of perlite in the product, and the ready de-watering and great thickness to which the board may be manufactured and the high speed of formation.

Obviously the invention is not limited to the details of the illustrative embodiments thereof since these may be variously modified. Moreover it is not indispensable that all features of the invention be used co-jointly since various features may be used to advantage in different combinations and sub-combinations.

Having described my invention I claim:

1. A thermal insulation molded from an aqueous slurry and consisting essentially of about sixty percent by weight of fine particles of expanded perlite substantially none of which exceed 20 mesh in size, said perlite being held in the form of a substantially thick sheet by a network of short absorbent vegetable fiber comprising about twenty percent by weight of the dry ingredients, said fiber having absorbed on its exterior surface asphalt deposited thereon from an asphalt emulsion to increase the mutual friction of the fibers, the asphalt being substantially entirely deposited on the exterior of the fibers but being insufficient in amount to bond the fibers.

2. As an article of manufacture, an insulating material consisting essentially of particles of expanded perlite held in molded form by a network of short fiber substantially uniformly distributed throughout the mass of perlite, the perlite being of 65 mesh and finer particle size with a substantial proportion as fine as 100 mesh, said perlite comprising not less than about 60% of the dry weight of the product, the fiber comprising not more than about 20% of the dry weight of the product and having on its surfaces not more than about 20% of the dry weight of the product of bituminous adhesive substance which increases the mutual friction between the fibers to give the product a strength analogous to that which would be obtainable from long fibers.

3. A thermal insulation consisting essentially of not less than about 60% by weight of fine particles of expanded perlite of 20 mesh and finer particle size with a substantial proportion as fine as 100 mesh, said perlite being held in the form of a substantially thick sheet by a network of short fiber comprising not more than about 20% by weight of the dry ingredients, the volumetric ratio of perlite to fiber being not less than about 5:1, the fiber being substantially uniformly distributed in the mass of perlite but being too short themselves to provide adequate strength, and an amount not exceeding about 20% of the dry weight of the product of bituminous adhesive substance on the exterior surfaces of the fibers to increase the mutual friction between the fibers to provide adequate strength.

4. The method of making a substantially thick insulation board or the like utilizing a continuously moving foraminous surface which comprises forming, with mixing, an aqueous slurry of pourable consistency and containing about 5%–8% by weight solids consisting essentially of (1) expanded perlite substantially none of which is larger than 20 mesh with a substantial proportion as fine as 100 mesh, (2) fiber, and (3) a small amount not exceeding approximately 25% of the dry weight of the product of a non-migrating adhesive substance, the volume of perlite being at least 5–7 times that of the fiber and the fiber being short so that during mixing the fiber may be uniformly distributed throughout the much larger volume of perlite in the slurry without appreciable bunching, containing the mixing until uniform distribution of the fiber is obtained, then while the constituents are in uniformly distributed condition in the slurry, forming a mat on said foraminous surface, dewatering the same, said fiber being held in separated condition during dewatering by means of the perlite to obtain rapid dewatering, and then drying the mat into board form.

5. The method of making a thick fibrous board, or the like, on a foraminous support which comprises making an aqueous slurry having a solids content consisting essentially of approximately (1) 60% expanded perlite, (2) 20% newsprint, and (3) 20% emulsified asphalt, the concentration of solids in said slurry being not less than approximately 3% by weight but not greater than approximately 8% by weight, forming on said foraminous support a relatively thick layer from such slurry of such thickness that when dry the product will not be substantially less than one inch in thickness, dewatering said layer by removing the water through said support until the particles of perlite are in substantial contact with each other, and drying said layer to remove residual moisture.

6. The method of manufacturing a fiber-perlite board comprising the steps of forming a slurry consisting essentially of fibers, expanded perlite particles, water repellent organic binder and water, said slurry having a solids consistency in the approximate range of 2.8%–8% by weight, said expanded perlite comprising about 60%–80% of the dry weight of the formed board, said fibers comprising about 35%–15% of the dry weight of the formed board, and said binder comprising a substantial portion of the dry weight of the formed board, continuously forming a wet mat of said solids and draining the water therefrom, and removing the residual moisture in the mat.

7. The method of forming light weight insulating material utilizing perlite containing a substantial portion of particles as small as 100 mesh, comprising making an aqueous slurry having a solids content consisting essentially of perlite, short fiber, and water repellent organic binder, the ratio by weight of perlite to fiber being at least approximately 3:1 and the amount of water being sufficient to form a slurry having a concentration of solids in the range of approximately 3%–15% by weight, mixing the slurry to secure uniform distribution of the fiber throughout the perlite, placing the slurry upon a foraminous surface to permit the water to drain from the solids deposited thereupon and the fibers to lie in the interstices between the perlite particles and be held thereby against segregation during draining off of the water, and removing the residual water by drying to render the binder effective.

8. The method of manufacturing a fibrous perlitic board comprising the steps of forming a slurry comprising fiber, water, and water repellent binder, adding expanded perlite thereto so as to form a slurry having a solids consistency in the range of approximately 3%–8% by weight, the approximate ranges of percentages of the solid ingredients being 35%–15% fiber, 60%–80% expanded perlite, and 5%–10% binder by weight of the solids of the ultimately formed dry board, most of said perlite particles being capable of passing a 20 mesh screen, transferring said solids in the slurry to a continuously moving foraminous support to form a mat thereon, and removing the moisture contained in said mat.

9. The method of manufacturing a fibrous-perlite board comprising the steps of forming a slurry consisting esssentially of fibers, expanded perlite particles, asphalt and water, the solids content of said slurry being in the approximate range of 2.8%–8% by weight, a major portion of said perlite particles being of a size to pass a 20 mesh screen, said perlite particles comprising about 60%–80% by weight of the resultant relatively dry board and the fiber particles comprising about 35%–15% by weight of the resultant dry board, continually transferring the slurry solids from said slurry to a conveyor in the form of a wet mat while draining the water therefrom, and removing residual moisture in the mat to form the fiber-perlite board.

10. The method of forming a rapidly dewatered insulation board, or the like of substantial thickness from an aqueous slurry which comprises making an aqueous slurry containing an amount not less than about 60% by weight of the solid constituents of the product of expanded perlite, the particle size of which is for the most part less than 20 mesh and a substantial proportion of which is as small as 100 mesh or finer, and not less than about 15% by weight of short fiber whose fiber length is short enough to permit uniform distribution of the fiber throughout the mass of perlite, and a small amount of adhesive material, the solids content of said slurry being in the approximate range of 3%–8% by weight, agitating the slurry to distribute said fibers uniformly throughout the slurry, transferring the slurry solids from said slurry to a conveyor in the form of a continuous wet mat and forming the solids thereof to such depth as to provide a product at least an inch in thickness, the perlite particles holding the fibers in separated condition and against segregation to maintain the free filtering characteristics of the perlite.

11. The method of manufacturing a fibrous perlitic board comprising the steps of forming a slurry of fiber, adhesive and water to a solids consistency of approximately 1%–3% by weight, mixing therewith expanded perlite particles to form a new slurry having a solids content of approximately 3%–8% by weight, forming a wet mat of solids from the new slurry on said continuously moving foraminous surface, and drying the mat into a board.

12. The method of manufacturing a fibrous perlitic board comprising the steps of forming a slurry consisting essentially of fiber, adhesive, and water, maintaining the slurry in whirlpool agitation while adding expanded perlitic particles thereto to prevent the perlitic particles from floating to the surface of the slurry, the total solids content of the slurry being approximately 3%–8% by weight, forming a mat from the slurry solids, and drying the formed mat to remove the residual moisture therefrom.

13. The method of manufacturing a fibrous perlitic board utilizing a continuously moving foraminous surface comprising the steps of forming a fibrous slurry, forming a vortex of the slurry, adding to the slurry vortex expanded perlite particles so as to obtain proper intermixing of the ingredients, the solids content of the new slurry being in the approximate range of 3%–8% by weight, and forming a board from the intermixed solids on said continuously moving foraminous surface.

14. The method of manufacturing a fibrous perlitic board comprising the steps of forming a slurry consisting essentially of fiber, adhesive, and water, adding expanded perlite particles to the slurry so as to produce a solids content in the range of approximately 3%–8% by weight, said perlite relative to the fibers being in the approximate range of 70–80 parts of perlite to 30–20 parts of fiber by weight, transferring the solids in said slurry to a continuously moving foraminous conveyor in the form of a mat while continuously draining the water therefrom, and drying the mat to remove most of the residual moisture contained in the board.

15. The method of manufacturing a fibrous perlitic board comprising the steps of forming a slurry consisting essentially of fiber, water, water repellent organic binder, and expanded perlite particles, said slurry having a solids content in the range of approximately 3%–15% by weight, the perlite particles being of a nature such that most of the particles pass a 20 mesh screen, depositing solids from the slurry upon a foraminous surface to form a wet mat thereon and drying the wet mat to remove excess residual moisture therein.

16. A method of producing an insulating board on a continuous basis utilizing a continuously moving foraminous surface comprising the steps of forming a slurry consisting essentially of fibers, expanded perlite particles, binder and water, wherein the slurry has a solids content within the range of approximately 3%–8% by weight, forming a wet mat of solids from said slurry on said continuously moving foraminous surface, and dewatering said wet mat.

17. A method of manufacturing an insulating board on a continuous basis utilizing a continuously moving foraminous surface, comprising the steps of forming a slurry consisting essentially of fibers, expanded perlite particles, adhesive and water, the solids content of said slurry being within the approximate range of 3%–8% by weight, said fibers comprising approximately 50%–10% by weight of the dry product, said perlite particles comprising approximately 40%–80% by weight of the dry product, and said adhesive being present in effective amount, up to about 25% by weight of the dry product, forming a wet mat of solids, and dewatering said mat from said slurry on said continuously moving foraminous surface.

18. An insulating material consisting essentially of approximately 40%–80% by weight of expanded perlite intertwined with a network of fiber, the expanded perlite being capable, for the most part, of passing a 20 mesh screen, the fibers comprising 50%–10% by weight of the product and being substantially uniformly distributed throughout the mass of perlite particles, and organic binder in effective amount, up to approximately 25% by weight of the product, assisting to hold the perlite and fiber in a relatively compact mass.

19. A thermal insulating material consisting essentially of approximately 60%–80% by weight of expanded perlite intertwined with a network of fiber, the expanded perlite being of a grade for the most part capable of passing a 20 mesh screen, the fibers comprising approximately 35%–15% by weight of the product and being substantially uniformly distributed through the mass of perlite particles, organic binder assisting to hold the perlite and fiber in a relatively compact mass, said binder being distributed in the mass and being selected from the group consisting of asphalt, resins, and starch.

20. An insulating material consisting essentially of approximately 60%–80% by weight of expanded perlite intertwined with a network of fiber, the expanded perlite comprising a substantial portion of particles of approximately 100 mesh or finer, the fibers comprising approximately 35%–15% by weight of the product and being substantially uniformly distributed through the mass of perlite particles, and water repellent organic binder distributed in the mass and assisting to hold the perlite and fiber in a relatively compact mass.

21. A thermal insulation consisting essentially of not less than about 60% by weight of fine particles of expanded perlite of 20 mesh and finer particle size with a substantial portion as fine as 100 mesh or finer, said perlite being held in the form of a substantially thick sheet by a network of fiber comprising not more than 50% but greater than 10% by weight of the dry ingredients, the fibers being substantially uniformly distributed in the mass of perlite but being too short of themselves to provide adequate strength, and a small but substantial amount, not exceeding approximately 25% of the dry weight of the product of organic adhesive substance on the exterior surfaces of the fibers and perlite and assisting to hold the mass together.

22. An insulating material which is essentially expanded perlite consisting essentially of very fine particles of expanded perlite held by a network of relatively short fibers substantially uniformly distributed throughout the mass of perlite, the perlite having substantially none of the particles larger than 20 mesh and having a substantial portion as fine as 100 mesh or finer, said perlite comprising not less than about 60% of the dry weight of the product, the fiber comprising approximately 35%–15% of the dry weight of the product, and said fibers and perlite having on their surfaces an effective amount, up to approximately 25% of organic adhesive substance by weight, assisting to hold the perlite and fiber in a relatively compact mass.

23. An insulating material consisting essentially of approximately 60%–80% by weight of expanded perlite intertwined with a network of fiber, the expanded perlite comprising a substantial portion of fine grained particles of approximately 100 mesh and finer, the fibers comprising approximately 35%–15% by weight of the product and being substantially uniformly distributed through the mass of perlite particles, and organic binder distributed through and assisting to hold the perlite and fiber in a relatively compact mass.

24. A molded light weight insulating material, consisting essentially of particles of expanded perlite some of which are as fine as 100 mesh in size, the perlite particles being in substantial contact, said contact being characterized by point contact as distinguished from surface contact thereby leaving a multitude of connecting interstices between the particles, and a minor amount of short fiber lying in said interstices and constituting a fiber network to hold said perlite in the molded shape, and an asphaltic binding constituent.

25. A molded light weight insulating material consisting essentially of particles of expanded perlite some of which are as fine as 100 mesh in size, the perlite particles being in substantial contact, said contact being characterized by point contact as distinguished from surface contact, thereby leaving a multitude of connecting interstices between the particles, and a minor amount of short fiber lying in said interstices and constituting a fiber network to hold said perlite in the molded shape, and a binding constituent consisting essentially of organic material.

References Cited in the file of this patent

UNITED STATES PATENTS

| | | |
|---|---|---|
| 1,763,910 | Streeter | June 17, 1930 |
| 2,204,581 | Denning | June 18, 1940 |
| 2,300,137 | Salisbury | Oct. 27, 1942 |
| 2,388,060 | Hicks | Oct. 30, 1945 |
| 2,487,207 | Adams | Nov. 8, 1949 |
| 2,517,235 | Pierce | Aug. 1, 1950 |
| 2,567,558 | Greider | Sept. 11, 1951 |
| 2,626,864 | Miscall | Jan. 27, 1953 |
| 2,705,197 | Seybold | Mar. 29, 1955 |
| 2,705,198 | Seybold | Mar. 29, 1955 |